Figure 1:
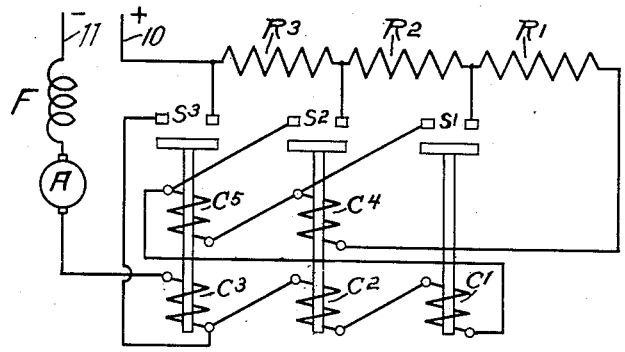

H. R. CANFIELD.
MOTOR CONTROL SYSTEM.
APPLICATION FILED DEC. 15, 1916.

1,306,212.

Patented June 10, 1919.
2 SHEETS—SHEET 1.

INVENTOR.
Harry R. Canfield
BY
ATTORNEY.

H. R. CANFIELD.
MOTOR CONTROL SYSTEM.
APPLICATION FILED DEC. 15, 1916.

1,306,212.

Patented June 10, 1919.
2 SHEETS—SHEET 2.

INVENTOR.
Harry R. Canfield
BY F. N. Barber
ATTORNEY.

UNITED STATES PATENT OFFICE.

HARRY R. CANFIELD, OF CLEVELAND, OHIO, ASSIGNOR TO THE ELECTRIC CONTROLLER & MANUFACTURING COMPANY, OF CLEVELAND, OHIO, A CORPORATION OF OHIO.

MOTOR-CONTROL SYSTEM.

1,306,212. Specification of Letters Patent. Patented June 10, 1919.

Application filed December 15, 1916. Serial No. 137,079.

*To all whom it may concern:*

Be it known that I, HARRY R. CANFIELD, a citizen of the United States, residing at Cleveland, in the county of Cuyahoga and State of Ohio, have invented new and useful Improvements in Motor-Control Systems, of which the following is a specification.

This invention relates generally to motor control systems, but more particularly to automatic electromagnetically controlled systems.

In a now well-known form of motor control system a train of accelerating switches is employed to close in a predetermined order and successively short-circuit sections of motor-starting resistance, each switch being of the series lock-open type, having its winding energized by the motor current and having the characteristic of being locked open, or held open magnetically, when the current in the winding is above a predetermined value, and of closing when the current falls to a predetermined value. It is sometimes desirable so to arrange the connections of the system that the windings of the series switches will all be simultaneously energized. Such a system, for instance, is shown in Patent No. 1,175,441, granted March 14, 1916, to J. H. Hall. Heretofore, in such systems in which the windings of the switches have been simultaneously energized, it has been customary to adjust the successive switches of the train to have successively lower predetermined closing values of motor current to prevent the simultaneous closure of all the switches of the train when the motor current has fallen to the closing value of the first switch of the train, or to prevent the switches from closing out of their predetermined order.

It is the principal object of this invention to provide a motor control system having a train of series lock-open switches, the windings of which are arranged to be simultaneously energized by the motor current, and in which each switch may be adjusted to close at a predetermined value of motor current regardless of the corresponding adjustments of the other switches of the train, and in which, notwithstanding, the switches cannot close simultaneously nor out of a predetermined order of closing.

With this and other objects in view, the invention consists of the apparatus and electrical connections thereof as described in the following specification, reference being made to the accompanying drawing, in which Figures 1, 2, 3, 4, 5 and 6 are diagrammatic representations of motor control systems embodying the present invention in different forms.

Referring to the form of the invention shown in Fig. 1, A represents the motor armature, and F the series field winding. $R^1$, $R^2$, and $R^3$ are three sections of starting resistance; and $S^1$, $S^2$, and $S^3$ are three accelerating switches for successively short-circuiting the said resistance sections to start the motor. Any suitable type of accelerating or resistance-cutting-out switch may be used, but I prefer to use for these switches the type of switch disclosed in Canfield's application, Serial Number 583,000, filed September 21, 1910, and Eastwood's Patent, No. 1,040,292, issued October 8, 1912, in which the energizing windings of the switches are connected in series with the motor and the switches possess the peculiar characteristic of being locked open when the current in the winding is above a predetermined value, and of closing when the current is reduced to that value. $C^1$, $C^2$, and $C^3$ are the main series windings of the switches $S^1$, $S^2$, $S^3$, respectively, the switches $S^2$ and $S^3$ having auxiliary windings $C^4$ and $C^5$. The auxiliary windings, $C^4$, $C^5$, may be wound so as to assist magnetically the main windings $C^2$ and $C^3$, or they may be wound to oppose magnetically the windings $C^2$ and $C^3$. Assuming first that the auxiliary windings are wound to assist the main windings, the operation of the system shown in Fig. 1 is as follows. The three switches, $S^1$, $S^2$, $S^3$ are shown in their open or normal, deënergized positions. To start the motor the positive and negative mains 10 and 11 are connected to a source of supply, and current flows, say, from the positive main 10 through the three sections of starting resistance, $R^3$, $R^2$, $R^1$, the auxiliary windings $C^4$ and $C^5$, the main series windings $C^1$, $C^2$, and $C^3$, the motor armature A and the field F to the negative supply main 11. The resistance sections, all the winding of the switches, and the motor are thus connected in series. The first rush of current locks open all of the switches, the switches $S^2$ and $S^3$ being locked open by the energization of the windings $C^2$ and $C^3$ plus the excess of energization due to the auxiliary windings $C^4$ and $C^5$. The motor starts, and when its current falls to the value for which the switch $S^1$ is adjusted to close, it closes and is held closed by its winding $C^1$. When the switch $S^1$ closes, its contacts short-circuit the resistance section $R^1$ and the auxiliary winding $C^4$ of the switch $S^2$. The rush of current which follows on short-circuiting the resistance section $R^1$ locks open the switch $S^2$ by means of the coil $C^2$ acting alone. When the motor current has fallen to the value for which the switch $S^2$ is set to close, it closes, and is held closed by its winding $C^2$. When the switch $S^2$ closes, its contacts short-circuit the resistance section $R^2$ and the auxiliary winding $C^5$ of the switch $S^3$, and the corresponding rush of current which occurs locks open the switch $S^3$ by its winding $C^3$ acting alone. When the current falls again to the value for which the switch $S^3$ is set to close, it closes, and is held closed by its coil $C^3$ acting alone. When $S^3$ closes, its contacts short-circuit the remaining section of resistance $R^3$, and the windings $C^1$ and $C^2$ of the switches $S^1$ and $S^2$, and these switches open, the current now flowing from the positive main 10 through the contacts of the switch $S^3$, the coil $C^3$, and the motor to the negative main 11.

The auxiliary windings $C^4$ and $C^5$ of the switches $S^2$ and $S^3$ give to these switches an excess of energization such that, so long as these auxiliary windings are in the circuit, the closing current value of these switches will be below the minimum motor starting current, and hence each of these switches will be locked open at all values of motor starting current until the preceding switch short circuits the auxiliary winding, whereupon the switch will be free to close when the motor current falls to the value for which the switch is set to close.

If now we assume that the auxiliary windings $C^4$ and $C^5$ are wound magnetically to oppose the main windings $C^2$ and $C^3$ of the switches $S^2$ and $S^3$, and that they are so proportioned that the auxiliary winding in each case substantially neutralizes the effect of the main winding, the operation of the form of the invention shown in Fig. 1 will be as follows:

Upon the first rush of motor current the switch $S^1$ will be locked open by its coil $C^1$ and the switches $S^2$ and $S^3$ will remain open normally, the auxiliary windings $C^4$ and $C^5$ substantially neutralizing the main windings $C^2$ and $C^3$. When the motor current falls to the value for which the switch $S^1$ is set, and it closes, short-circuiting as before the resistance section $R^1$ and the auxiliary windings $C^4$ of the switch $S^2$, the switch $S^2$ will be locked open by the rush of current through the main winding $C^2$ acting alone. When the switch $S^2$ closes, short-circuiting the resistance section $R^2$ and the auxiliary winding $C^5$ of the switch $S^3$, the switch $S^3$ will be locked open by the rush of current in its main winding $C^3$ acting alone.

Thus, as in the case above described, in which the auxiliary windings assisting the main windings, the switches $S^2$ and $S^3$ will remain open at all values of motor current until the closure of the preceding switch short-circuits the auxiliary winding.

Figure 2:
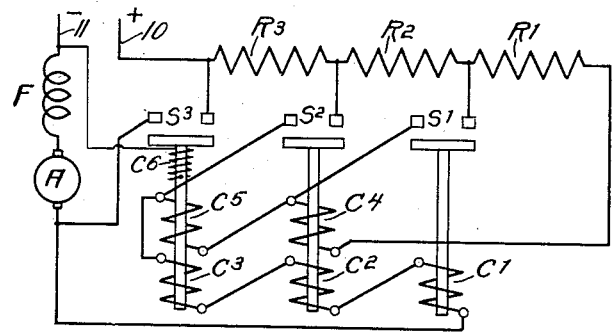

In the form of the invention shown in Fig. 2, the same parts are shown and are given the same reference characters as in Fig. 1. In addition, the switch $S^3$ is provided with a shunt-wound holding coil $C^6$, which merely acts to hold the switch closed after it has closed, but is not sufficiently strong of itself to close the switch. The shunt holding coil $C^6$ is unenergized when the switch $S^3$ is open, but when the switch $S^3$ closes, the coil $C^6$ is connected directly across the mains 10 and 11, one end of the winding $C^6$ being connected to the negative main permanently, and the other end being grounded on the switch $S^3$, whereby it is connected to the positive main through the right-hand contact of the switch $S^3$ when the switch closes.

The operation of the system shown in Fig. 2 is similar to that shown in Fig. 1. The auxiliary windings $C^4$ and $C^5$ may be wound to assist magnetically the main windings $C^2$ and $C^3$, or they may be wound to substantially neutralize them, as in Fig. 1. The system in Fig. 2 differs from that in Fig. 1 in that, when the motor current flows from the positive main 10 through the resistance sections and the auxiliary windings $C^4$ and $C^5$, it flows through the main windings $C^3$, $C^2$, and $C^1$ in the order named, instead of in the reverse order as in Fig. 1 and in that the left-hand brush of the switch $S^3$ is connected directly to the motor. In consequence the wiring connections are simplified, and after the closure of the switch $S^3$ none of the switch windings are left in series with the motor, the last switch, $S^3$, being held closed by the shunt winding $C^3$.

Figure 3:
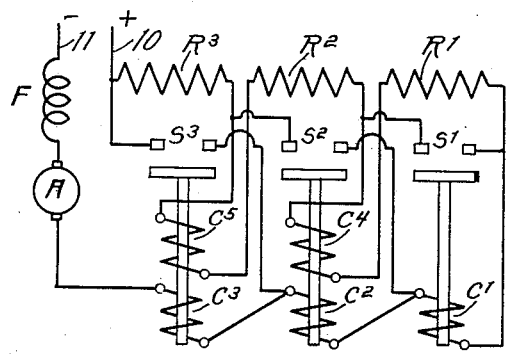

In the form of the invention shown in Fig. 3, the same parts and the same reference characters are used as in Fig. 1, and the operation is similar to that in Fig. 1. The auxiliary windings $C^4$ and $C^5$ may, as before, be wound to oppose or to assist magnetically the main windings $C^2$ and $C^3$ of the switches $S^2$ and $S^3$. While in Fig. 1 the resistance sections $R^3$, $R^2$, $R^1$ are all connected together in a continuous bank, the resistance sections in Fig. 3 are insulated from each other and the auxiliary windings $C^5$ and $C^4$ connected between adjacent sections of resistance. In the operation of the form shown in Fig. 3, when the switch $S^1$ closes it shortcircuits the resistance section $R^1$ and the auxiliary coil $C^4$, and is held closed by the coil $C^1$. When the switch $S^2$ closes it shortcircuits the resistance section $R^2$, and the auxiliary winding $C^5$, and also the winding $C^1$ of the switch $S^1$, and the switch $S^1$ opens. When the switch $S^3$ closes it short-circuits the remaining section of resistance $R^3$ and the main winding $C^2$ of the switch $S^2$, and the switch $S^2$ opens, and the switch $S^3$ is held closed by its main winding $C^3$.

Figure 4:
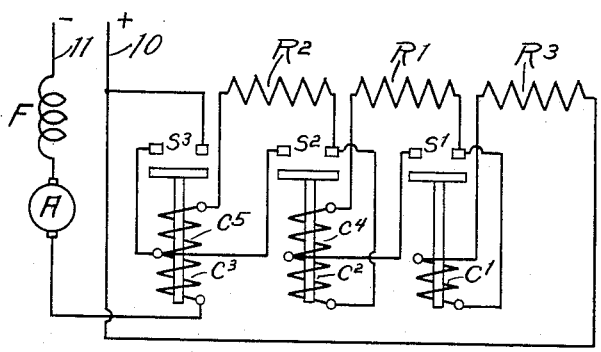

In the form of the invention shown in Fig. 4, the same parts and the same reference characters are used as in the other figures, the general arrangement being comparable with Fig. 3. The auxiliary windings $C^4$ and $C^5$ may, as before, be wound to oppose or to assist magnetically the main windings $C^2$ and $C^3$ of the switches $S^2$ and $S^3$. The resistance sections $R^1$, $R^2$, and $R^3$ are insulated from each other, as in Fig. 3, and the auxiliary windings $C^4$ and $C^5$ are in series with the resistance sections $R^1$ and $R^2$. The resistance sections are arranged in the consecutive order, $R^3$, $R^1$, $R^2$. A particular departure is made in this system from that shown in Figs. 1, 2, and 3, in that the main winding and auxiliary winding, such as $C^2$ and $C^4$ of the switch $S^2$, are not insulated from each other, but are formed by providing a continuous winding with a tap connection intermediate the ends of the winding, as plainly shown.

In the operation of the form shown in Fig. 4, current flows from the positive supply main 10, through resistance section $R^3$, the winding $C^1$ of the switch $S^1$, the resistance section $R^1$, the auxiliary winding $C^4$ and the main winding $C^2$ of the continuous winding of the switch $S^2$, the resistance section $R^2$, the auxiliary winding $C^5$ and the main winding $C^3$ of the continuous winding of the switch $S^3$, through the motor armature A, and the motor field F to the positive supply main 11. When the switch $S^1$ closes it short circuits the resistance section $R^1$ and the auxiliary part $C^4$ of the winding of the switch $S^2$, and is held closed by its coil $C^1$. When the switch $S^2$ closes it shortcircuits the resistance section $R^2$ and the auxiliary part $C^5$ of the winding of the switch $S^3$, and is held closed by the main part $C^2$ of its winding. When the switch $S^3$ closes it is held closed by the main part $C^3$ of its winding, and shortcircuits the remaining resistance section $R^3$ and the windings $C^1$ and $C^2$, causing the switches $S^1$ and $S^2$ to drop open, the current then flowing from the positive main 10 through the contacts of the switch $S^3$, the main part $C^3$ of the winding of the switch $S^3$, through the motor armature A and the field F to the negative supply main 11.

Figure 5:
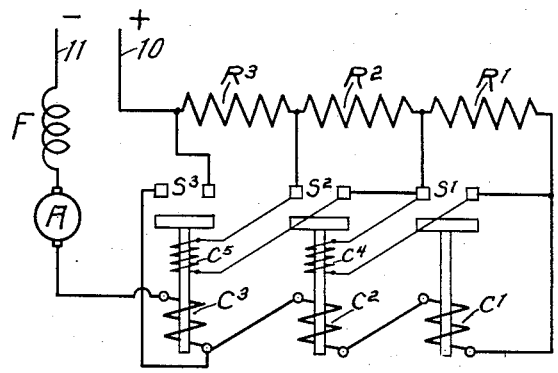
Figure 6:
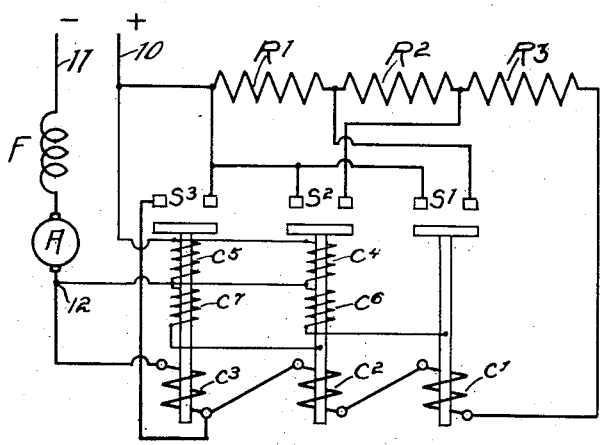

In the form of the invention shown in Figs. 5 and 6, the reference characters and the general arrangement of the parts are similar to those in the other figures, but in these two forms of the invention the auxiliary windings are shunt windings instead of series windings. In Fig. 5 the auxiliary winding $C^4$ of the switch $S^2$ is connected in shunt with a resistance section $R^1$, and the auxiliary winding $C^5$ of the switch $S^3$ is connected in shunt with the resistance section $R^2$. The auxiliary windings $C^4$ and $C^5$ may, as before, be wound to oppose or to assist magnetically the main windings $C^2$ and $C^3$ of the switches $S^2$ and $S^3$. In operation current flows from the positive supply main 10, through the resistance sections $R^3$, $R^2$, $R^1$, through the main windings $C^1$, $C^2$, $C^3$ of switches $S^1$, $S^2$, $S^3$, through the armature A and field F to negative supply main 11. The drop in potential across the terminals of the resistance sections $R^2$ and $R^1$ causes current to flow through the auxiliary windings $C^4$ and $C^5$. When the switch $S^1$ closes it short circuits the resistance section $R^1$ and the auxiliary part $C^4$ of the winding of the switch $S^2$, and is held closed by coil $C^1$. When the switch $S^2$ closes, it short-circuits the resistance section $R^2$ and the auxiliary part $C^5$ of the winding of the switch $S^3$, and is held closed by the main part $C^2$ of its winding. When the switch $S^3$ closes it is held closed by the main part $C^3$ of its winding, and short-circuits the remainder of the resistance section $R^3$ and the windings of $C^1$ and $C^2$, causing switches $S^1$ and $S^2$ to drop open, the current then flowing from the positive main 10 through the contacts of the switch $S^3$, the main part $C^3$ of the winding of the switch $S^3$, through motor armature A and field F to the negative supply main 11.

In the form shown in Fig. 6, the auxiliary shunt windings $C^4$ and $C^5$ may, as before, be wound to assist or to oppose the main windings $C^2$ and $C^3$. One end of these windings is connected to the positive supply main 10, and the other is connected at the point 12 which lies between the motor armature A and the resistance bank, and the auxiliary shunt coils $C^4$ and $C^5$ are caused to receive current by the drop in potential in all of the starting resistance sections caused by the motor current flowing therethrough. The switches $S^2$ and $S^3$ have other auxiliary coils $C^6$ and $C^7$, wound oppositely to the coils $C^4$ and $C^5$, and when energized neutralizing the coils $C^4$ and $C^5$.

In the operation of the form shown in Fig. 6, current flows from the positive supply main 10, through the resistance sections $R^1$, $R^2$, $R^3$, the windings $C^1$, $C^2$, $C^3$ of the switches $S^1$, $S^2$, $S^3$, through the motor armature A and field F to the negative supply main 11. The auxiliary windings $C^4$ and $C^5$ are energized as above described and at this point in the operation are energized with practically full line voltage drop through the resistance sections $R^1$, $R^2$, $R^3$. When the switch $S^1$ closes it short-circuits the resistance section $R^1$ and energizes the auxiliary winding C⁶ of the switch S², current flowing from the positive supply main 11 directly to the left-hand contactor of the switch S¹ into the switch frame, and thence through the winding C⁶ to the point 12. The windings C⁶ and C⁴ are thus energized by the same voltage, viz., the potential drop caused by the motor current flowing through the resistance sections R² and R³, and they neutralize each other. The auxiliary coil C⁵ is now energized by reduced voltage, the potential drop through resistance sections R² and R³, but this by proper design may be made sufficient to prevent the closure of switch S³ by assisting or opposing the main part C³ of the winding, as heretofore described. When the switch S² closes it short-circuits the resistance section R² and energizes the auxiliary shunt winding C⁷ of the switch S³ by current flowing from positive directly to the left-hand brush of the switch S², into the switch frame, through the coil C⁷ to the point 12. The auxiliary coils C⁵ and C⁷ are now both energized by the same voltage, viz., the drop in potential through the resistance section R³, and therefore neutralize each other. When the switches S¹ and S² close, they are held closed by their main windings C¹ and C². When the switch S³ closes its short-circuits the resistance section R³ and the windings C¹ and C², causing the switches S¹ and S² to open, and is held closed by its winding C³, the current flowing from the positive supply main 10, through the closed contacts of the switch S³, the coil C³, armature A, and field F to the negative supply main 11. All of the resistance sections now being short-circuited, the shunt auxiliary coils receive no current.

My invention is not to be limited to the exact form of the motor control systems shown and described, for it will be apparent that the simultaneously energized main windings of the switches may be combined in various other ways with auxiliary windings either shunt wound or series wound or both. It will also be apparent that my invention may be carried out with other forms of accelerating switches than those shown and described and referred to. Various changes and modifications may be made in my invention without departing from its spirit or sacrificing its advantages.

This application is a continuation of my application Serial Number 115,190, filed August 16, 1916, so far as Figs. 1, 2 and 3 are concerned.

I claim—

1. In a controller for electric circuits, a circuit to be controlled, and a series of switches therefor arranged to close in a predetermined order, a main energizing operating winding for each switch and an auxiliary energizing winding for each of certain ones of the switches for augmenting the energization produced by the main winding, and means whereby all the windings are simultaneously energized by the current in the controlled circuit, whereby each auxiliary winding prevents the closure of its respective switch when the current in the main winding is above a predetermined value only, whereby the closure of each of certain switches deënergizes the auxiliary winding of the succeeding switch and thereby adapts the succeeding switch to be prevented from closure by the current in the main winding when above a second larger predetermined value, and whereby the main winding operates the switch and holds it in operated position when the current in the main winding is below a second predetermined value.

2. In a controller for electric circuits, a circuit to be controlled, and a series of switches therefor arranged to close in a predetermined order, a main energizing operating winding for each switch and an auxiliary energizing winding for each of certain ones of the switches for augmenting the energization produced by the main winding, all the main windings being connected in series and adapted to be simultaneously energized by the current in the controlled circuit, and means whereby each auxiliary winding prevents the closure of its respective switch when the current in the main winding is above a predetermined value, whereby the closure of each of certain switches deënergizes the auxiliary winding of the succeeding switch and thereby adapts the succeeding switch to be prevented from closure by the current in the main winding when above a second larger predetermined value only, and whereby the main winding operates the switch and holds it in operated position when the current in the main winding is below a second predetermined value.

3. In a controller for electric circuits, a circuit to be controlled, and a series of switches therefor arranged to close in a predetermined order, a main energizing operating winding for each switch and an auxiliary energizing winding for each of certain ones of the switches for augmenting the energization produced by the main winding, all the windings being connected in series with the controlled circuit and with each other and adapted to be simultaneously energized by the current therein, and means whereby each auxiliary winding prevents the closure of its respective switch when the current in the main winding is above a predetermined value, whereby the closure of each of certain switches deënergizes the auxiliary winding of the succeeding switch and thereby adapts the succeeding switch to be prevented from closure by the current in the main winding when above a second larger predetermined value only, and whereby the main winding operates the switch and holds it in operated position when the current in the main winding is below a second predetermined value.

4. In a controller for electric circuits, a circuit to be controlled, and a series of normally open switches therefor arranged to close in a predetermined order, a winding for locking open and operating each switch, the windings being all connected in series and adapted to be simultaneously energized by current in the controlled circuit, and means whereby each of certain ones of the windings prevents the closure of its respective switch when the current therein is above a predetermined value, whereby the closure of each of certain switches deënergizes a portion of the winding of the succeeding switch and thereby adapts the succeeding switch to be locked open by the current in its winding when above a second larger predetermined value only, and whereby the remaining portion of the winding operates the switch and holds it in operated position when the current in the main winding is below the second predetermined value.

5. In a controller for electric circuits, a circuit to be controlled, and a series of normally open switches therefor arranged to close in a predetermined order, an energizing winding for locking open and operating each switch, the winding of certain ones of the switches being continuous and divided into two parts by an interior tap connection forming a main and an auxiliary energizing winding, each augmenting the energization produced by the other, all of the windings of all of the switches being connected in series in the circuit to be controlled and adapted to be simultaneously energized by the current therein, and means whereby each auxiliary winding prevents the closure of its respective switch when the current in the main winding is above a predetermined value, whereby the closure of each of certain switches deënergizes the auxiliary winding of the succeeding switch and thereby adapts the succeeding switch to be locked open by the current in the main winding when above a second larger predetermined value, and whereby the main winding operates the switch and holds it in operated position when the current in the main winding is below the second predetermined value.

6. In an electric circuit controller, a circuit to be controlled and a series of normally open electro-magnetic switches having their operating windings in series with each other and the circuit and adapted to be closed in a definite order and to be locked open by the current when it exceeds a predetermined value and to be closed and held closed thereby when the current becomes of that value, an auxiliary series winding for each of certain ones of the switches, all energized simultaneously with the operating windings and each arranged, when energized, to assist the operating winding of its switch to lock the same open and prevent its closure when the current in its operating winding is reduced to its switch-operating value, and circuit connections whereby, when a switch closes, it deënergizes the auxiliary winding of the next switch to close and thereby leaves the same under the control of its operating winding.

7. In an electric circuit controller, a circuit to be controlled and a series of normally open electromagnetic switches having their windings simultaneously energized by current in the circuit and adapted to be closed in a definite order and to be locked open by the current when it exceeds a predetermined value and to be closed and held closed thereby when the current becomes of that value, an auxiliary series winding for each of certain ones of the switches all energized simultaneously by current in the circuit and each arranged, when energized, to assist the operating winding of its switch to lock the same open and prevent its closure when the current in its operating winding is reduced to its switch-operating value, and circuit connections whereby, when a switch closes, it deënergizes the auxiliary winding of the next switch to close and thereby leaves the same under the control of its operating winding.

8. In an electric circuit controller, a circuit to be controlled and a series of normally open electromagnetic switches having their windings connected in series and simultaneously energized by current in the circuit and adapted to be closed in a definite order and to be locked open by the current when it exceeds a predetermined value and to be closed and held closed thereby when the current becomes of that value, an auxiliary series winding for each of certain ones of the switches all energized simultaneously by current in the circuit and each arranged, when energized, to assist the operating winding of its switch to lock the same open and prevent its closure when the current in its operating winding is reduced to its switch-operating value, and circuit connections whereby, when a switch closes, it deënergizes the auxiliary winding of the next switch to close and thereby leaves the same under the control of its operating winding.

Signed at Cleveland, Ohio, this 11th day of Dec., 1916.

HARRY R. CANFIELD